United States Patent [19]

Lyle, Jr. et al.

[11] Patent Number: 4,798,870
[45] Date of Patent: Jan. 17, 1989

[54] REACTIVE SURFACE FOR DECONTAMINATION

[75] Inventors: Robert E. Lyle, Jr., San Antonio; Henry F. Hamil, New Braunfels, both of Tex.

[73] Assignee: Southwest Research Institute, San Antonio, Tex.

[21] Appl. No.: 937,911

[22] Filed: Dec. 4, 1986

Related U.S. Application Data

[63] Continuation-in-part of Ser. No. 659,183, Oct. 9, 1984, abandoned.

[51] Int. Cl.$^4$ .............................................. C08F 8/18
[52] U.S. Cl. ............................... 525/327.1; 525/333.3; 525/333.6; 525/356; 525/359.5
[58] Field of Search ................... 525/327.1, 356, 359.5, 525/333.3, 333.6

[56] References Cited

U.S. PATENT DOCUMENTS

| | | | |
|---|---|---|---|
| 2,860,097 | 11/1958 | Joda et al. | 525/327.1 |
| 4,157,433 | 6/1979 | Phillips | 525/32.71 |
| 4,463,080 | 7/1984 | Snow et al. | 525/327.1 |
| 4,596,756 | 6/1986 | Yamanouchi et al. | 525/327.1 |

OTHER PUBLICATIONS

"Inorganic Chemistry", Kleinberg et al. D.C. Heath and Company, Boston, Mass, 1960, pp. 466-469.

Primary Examiner—Joseph L. Schofer
Assistant Examiner—B. Lipman
Attorney, Agent, or Firm—Sigalos, Levine & Montgomery

[57] ABSTRACT

The invention comprises regenerative reactive articles having surfaces useful for decontamination comprising hydrohalide-polyhalides or quaternary halide-perhalide salts corresponding to the formula:

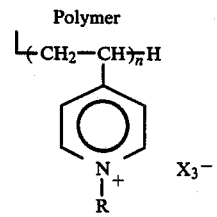

wherein X is BR or I; n is an integer of about 5 to 1,000, R is H or a $C_1$-$C_3$ alkyl radical; and the backbone polymer is in the form of a film or fabric. The invention also comprises the process of preparing the said reactive surfaces.

11 Claims, No Drawings

REACTIVE SURFACE FOR DECONTAMINATION

This invention was made under United States Government Contract No. DAMD17-83-C-3128 and the United States Government has a nonexclusive, nontransferable, irrevocable, paid-up licence to practice or have practiced for or on behalf of the United States, this invention throughout the world.

CROSS-REFERENCE TO RELATED APPLICATION

This application is a continuation-in-part of application Ser. No. 659,183, filed Oct. 9, 1984 now abandoned.

BACKGROUND OF THE INVENTION

The treatment of military and civilian casualties exposed to chemical warfare agents is complicated for both the casualty and the medical team that is suppling aid. In order to provide the optimum conditions for treatment of wounds in this situation, it is essential that methods be devised which provide protection for those supplying aid, decontamination, and containment of any chemical agent remaining on the casualty or his clothing.

At the present time, halogen compounds based on iodine, bromine, and chlorine are used as decontamination agents of toxic compounds. As an example, U.S. Pat. No. 2,927,037 describes the use of protective clothing impregnated with certain chlorine compounds as being able to decontaminate or protect against toxic agents. However, many of these decontaminating agents are corrosive to skin and metals, present difficulties in handling, and/or are short-lived. While stated to be effective over long periods of time, they do, in fact, lose their activity quickly. Moreover, in most cases where the decontamination agents are to be again impregnated onto a surface to be protected, one is again faced with the problem of handling a substance which is difficult to handle, corrosive, and the like.

SUMMARY OF THE INVENTION

The present invention overcomes the problems of the prior art and provides stable and relatively noncorrosive decontaminating agents onto the surface of articles which are to be protected and whose activity can readily be regenerated.

Briefly stated, the present invention comprises reactive polymer articles having ionically bound thereto a decontaminating polyhalide in an amount sufficient to decontaminate. The invention also comprises the method of making such articles comprising grafting an amine containing monomer to said polymer surface to give said surface an unreacted tertiary amine and converting said amine to a hydrohalide-polyhalide or quaternary halide-polyhalide salt.

DETAILED DESCRIPTION

As used herein the phrase "polymer surface" means the surface of any article; such as any fabric or film, made of a water-insoluble or water-soluble polymer such as polyethylene, polypropylene, polystyrene, tetrafluoroethylene, polyvinylpyrrolidine, copolymers of vinylpyridine, cellulose and the like. Compounds such as vinylpyridine can be chemically bonded to the surfaces to make them suitable for use in the present invention. Any of the well-known and conventional chemical bonding methods can be used, such as radiation-initiated graft polymerization. Typically, the fabric or film will be in the form of an article of clothing, such as a shirt, pants, jacket, hat, surgical mask or the like, or a protective covering such as a sheet, bandage, wound covering, wrap, or the like.

The initial step is to graft reactive amine sites onto the polymer surface of those backbone polymers which do not already have a quaternizable amine as part of the polymer backbone. Tertiary amines are utilized for this purpose and most suitably pyridines such as 4-vinyl pyridine and 2-vinyl pyridine. The grafting is carried out using conventional ionizing radiation techniques to induce the polymerization.

Alternatively, chloromethystyrene can be grafted onto such surfaces, and subsequently reacted with amines to provide the required reactive amine sites.

In either case the amount of amine grafted will vary dependent upon the decontamination and/or sterilization desired; it being evident that the upper limit is dependent upon the number of grafting sites on the water-insoluble polymer fabric or film.

The amine nucleus is treated with an alkylating agent such as methyl halide and the halide ion converted to a variety of polyhalide reaction anions, such as $I_3$, $Br_3$, and $N_3$ as shown by the equation below, wherein X is a halide. This reaction forms a quaternary halide-polyhalide salt.

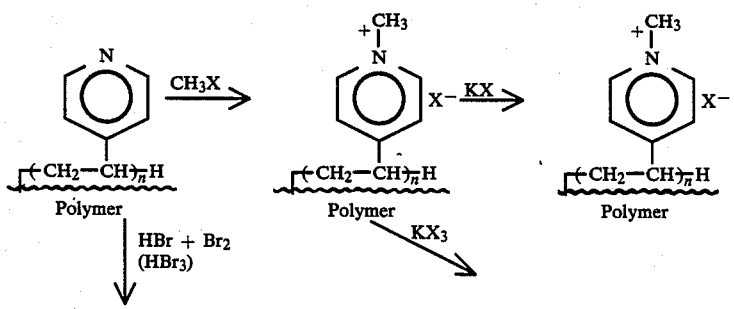

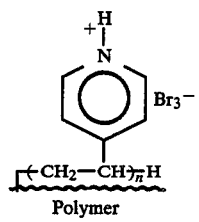

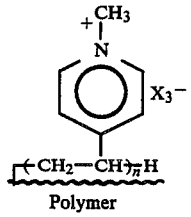

In the above formulations n is the degree of polymerization of the grafted vinylpyridine side chain and is between about 5 and 1000.

Additionally, the trihalide polymer can be generated by treating the amine nucleus with $HBr_3$, thus converting the amine to a hydrohalide-polyhalide.

Utilizing the chloromethystyrene grafted polymer film the following quaternary halide-polyhalide salt can be prepared upon the addition of pyridine and $HI_3$:

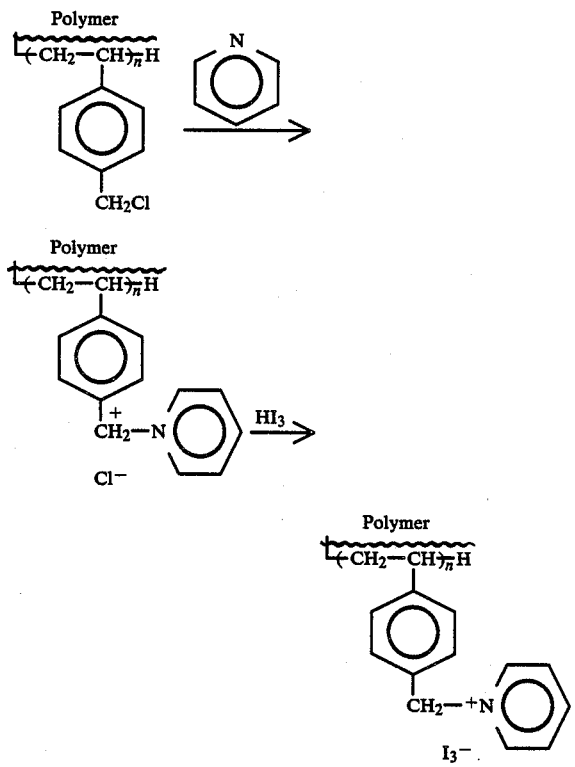

where n is the degree of polymerization of the grafted chloromethylstyrene side chain and is between about 15 and 1000.

The trihalide form of the quaternary salt has a highly intensive color, and as the surface undergoes reaction with the toxic agent the trihalide ion is reduced and the color fades, thus, the reactive surfaces of the present invention act as indicators showing when the reactivity of the surface has been expended

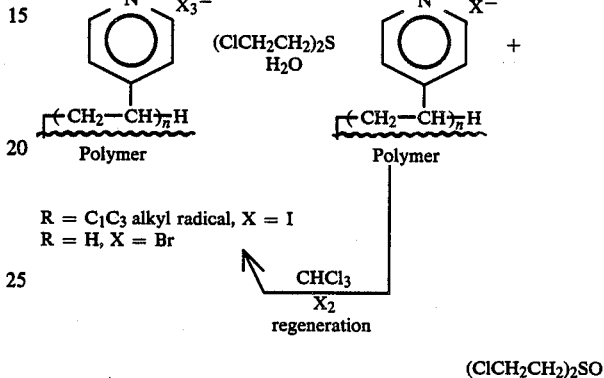

$R = C_1C_3$ alkyl radical, $X = I$
$R = H$, $X = Br$

However, the reactivity can be regenerated (the halide regenerated to the polyhalide form) by washing the surface (fabric or film) with a halogen solution in chloroform or a trihalide solution in water according to the foregoing equation wherein R is H or a $C_1$-$C_3$ alkyl radical and X is I or Br.

The invention will be further illustrated in conjunction with the following examples, which are set forth for purposes of illustration only and not by way of limitation.

EXAMPLE 1

Procedures for Film Preparation

The polymer surfaces are graft copolymers prepared by the radiation-initiated graft polymerization of the desired monomer onto low density polyethylene film.

The polyethylene (0.025 mm thickness, 14 inches×25 feet) is interleaved with cheesecloth and rolled around a 0.5 inch aluminum rod. The rolled film is placed into a hydrometer jar which is closed with a rubber stopper containing inlet and outlet tubes. The jar is connected to a manifold and alternately evacuated to 0.5 cm Hg and pressured with $N_2$ to ambient pressure in order to remove oxygen. Five (5) evacuation-pressurization cycles are used. The jar is evacuated again and the grafting solution (monomer plus solvent) is drawn into the jar to immerse the film roll. The filled jar is placed in the irradiation cell and is exposed to cobalt 60 gamma radiation at an applied dose rate of 12,000 rads per hour for 68 hours. Total applied radiation dose is 0.811 M rad.

After standing overnight, the jar is opened, the grafted film is separated from the cheesecloth backing, washed three times with a suitable solvent to remove any homopolymer, and is air dried.

Grafting solution compositions for the films are:

| BD-1 | 20 wt % 2-vinylpyridine |
| | 80 wt % methanol |

| -continued | |
|---|---|
| BD-2 | 25 wt % 4-vinylpyridine |
| | 75 wt % methanol |
| BD-3 | 25 wt % 4-vinylpyridine |
| | 1 wt % divinyl benzene |
| | 74 wt % methanol |

Quaternization of Grafted Films

Approximately 3 ft² of each film (Ca 12 g) were placed in one liter Erlenmeyer flasks. To each flask was added 750 ml reagent grade methanol containing 30 ml methyl iodide. The stoppered flasks were agitated for three days on a reciprocating platform shaker. The films were removed, washed twice with methanol, and air dried.

Film designations were BD-1-Q; BD-2-Q; BD-3-Q.

Preparation of Perbromide Films

Samples of the three films (3 ft² each, Ca 12 g) were placed in separate one liter wide mouth jars. To each jar was added 250 ml reagent (120 ml concentrated HBr plus 40 ml Br₂ per liter) and 500 ml deionized water. The capped jars were placed on a reciprocating platform shaker and agitated overnight. The excess reagent was decanted, the films transferred to three liter stainless steel beakers, and each film was washed five times with 2 liter portions of deionized water. The washed films were placed between layers of absorbent paper toweling and air dried overnight. After drying the cross-linked film prepared from BD-3 was found to be extremely brittle and to disintegrate upon handling. The other two films were stored in amber bottles.

Film designations were BD-1-HBr₃; BD-2-HBr₃.

EXAMPLE 2

Preparation of Periodide Films

The procedure for film preparation and quaternization of the grafted films are the same as in Example 1.

Samples of the three quaternized films (3 ft², Ca 12 g) were placed in separate one liter wide mouth jars. To each was added 330 ml of KI-I₂ solution (0.2N in KI₃) along with sufficient deionized water to fill the jars to within one inch of the top. The capped jars were agitated on a reciprocating platform shaker for 48 hours. The films were transferred to three liter stainless steel beakers and washed five times with two liter portions of deionized water and dried overnight between absorbent paper toweling. Film BD-3- Q-I₃ disintegrated upon washing and was discarded. The remaining two lustrous red-black films were stored in amber bottles.

Film designations were BD1-Q-I₃; BD-2-Q-I₃.

Alternatively, the periodide films can be prepared as follows:

Samples of each of three films (6"×6") were placed in separate 500 ml Erlenmeyer flasks. To each flask was added 300 ml chloroform containing 3 g I₂. The stoppered flasks were shaken overnight. Each film was washed four times with 300 ml portions of chloroform. The cross-linked film (BD-3-Q) disintegrated upon washing. The two remaining films were dried between absorbent paper toweling. The two remaining films (lustrous red-black flexible films) were stored in amber bottles.

Film designations were BD-1-Q-I₃ (CHCl₃/I₂); BD-2-Q-I₃ (CHCl₃/I₂).

EXAMPLE 3

Preparation of Azide Films

The procedure for film preparation and quaternization of the grafted films are the same as in Example 1.

One ft² samples of films BD-1-Q and BD-2-Q were placed in separate one liter jars. To each jar was added 200 ml of 0.2M sodium azide and 500 ml of deionized water. After shaking for two days on a reciprocating platform shaker, the films were removed from the jars, washed four times with 2 liter portions of deionized water, and dried overnight between layers of absorbent toweling. Film BD-1-Q afforded a colorless transparent film; Film BD-2-Q afforded a pale blue translucent film. The two films were stored in amber bottles.

Film designations were BD-1-Q-N₃; BD-2-Q-N₃.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A regenerative reactive article comprising a polymer surface having attached thereto a hydrohalide-polyhalide or quarternary halide-perhalide salt corresponding to the formula:

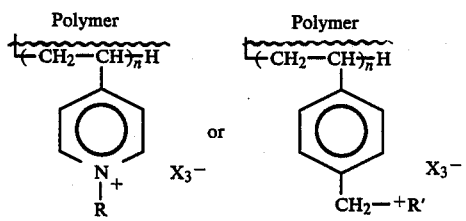

wherein X is Br or I; n is an integer of about 5 to 1,000; R is H or a $C_1$–$C_3$ alkyl radical, and R' is a tertiary amine.

2. The article of claim 1, wherein R is a methyl radical and said article is a film or fabric.

3. A process of preparing an article with a regenerative reactive surface as in claim 1 comprising forming perhalide salts on reactive sites present or grafted on polymer surfaces by reaction in a solution of a halogen in a suitable solvent at a temperature and for a time sufficient to convert the surface to a perhalide salt.

4. The process of claim 3, wherein the reactive site is selected from a tertiary amine, or aminated chloromethylstyrene.

5. The process of claim 4, wherein the perhalides formed are salts of bromine or iodine.

6. The process of claim 3, wherein the backbone polymer is polyethylene, tetrafluoroethylene, polypropylene, polystyrene, polyvinylpyrrolidine, or copolymers of vinylpyridine.

7. The process of claim 3, wherein the polymer film contains an amine as part of the polymer backbone.

8. The process of claim 3, wherein the polymer surface is formed by grafting with a compound selected from 4-vinylpyridine and 2-vinylpyridine.

9. The process of claim 3, 4, 5, 6, 7, or 8, wherein the perhalide salt is formed by treating the grafted film with an alkylating agent selected from methyl iodide and the halide ion, or methyl bromide and the halide ion, or with a solution of trihalide ions such as bromine or iodine.

10. A process of regenerating the reactive quaternary halide-perhalide or hydrohalide polyhalide salt of the article of claim 1 or 2 whose reactivity has been expended comprising washing the article containing reduced monohalide quaternary or hydrohalide salt compound with a halogen solution in chloroform or a trihalide solution in water.

11. Process of claim 10, wherein the halogen solution is comprised of bromine or iodine.

* * * * *

UNITED STATES PATENT AND TRADEMARK OFFICE
CERTIFICATE OF CORRECTION

PATENT NO. : 4,798,870
DATED : January 17, 1989
INVENTOR(S) : Lyle, Jr. et al.

It is certified that error appears in the above-identified patent and that said Letters Patent is hereby corrected as shown below:

Column 3, lines 30 to 59, cancel the same and substitute therefor the following:

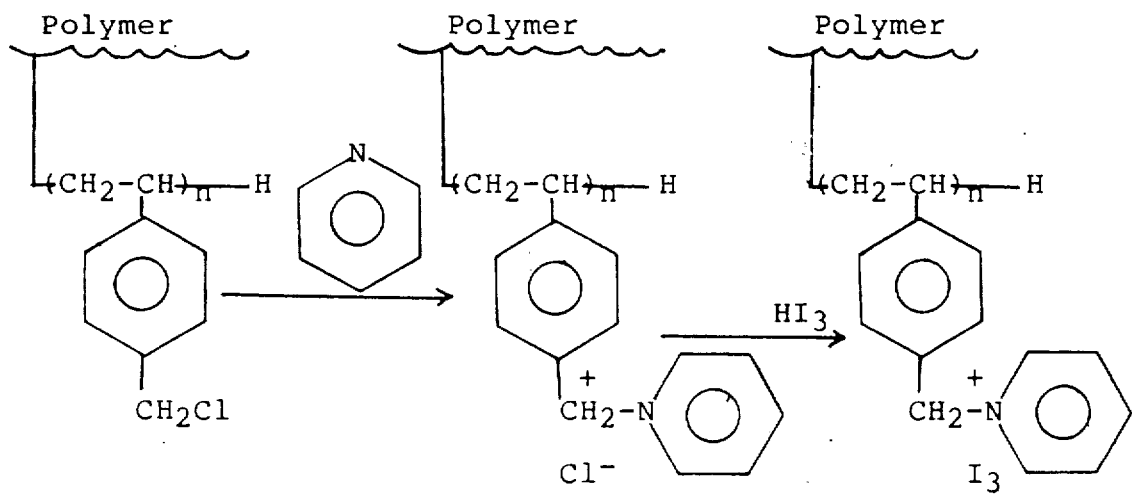

UNITED STATES PATENT AND TRADEMARK OFFICE
CERTIFICATE OF CORRECTION

PATENT NO. : 4,798,870
DATED : January 17, 1989
INVENTOR(S) : Lyle, Jr. et al.

It is certified that error appears in the above-identified patent and that said Letters Patent is hereby corrected as shown below:

Lines 49 et seq in columns 1 and 2 and lines 1 to 12 in columns 3 and 4 should be cancelled and the following substituted:

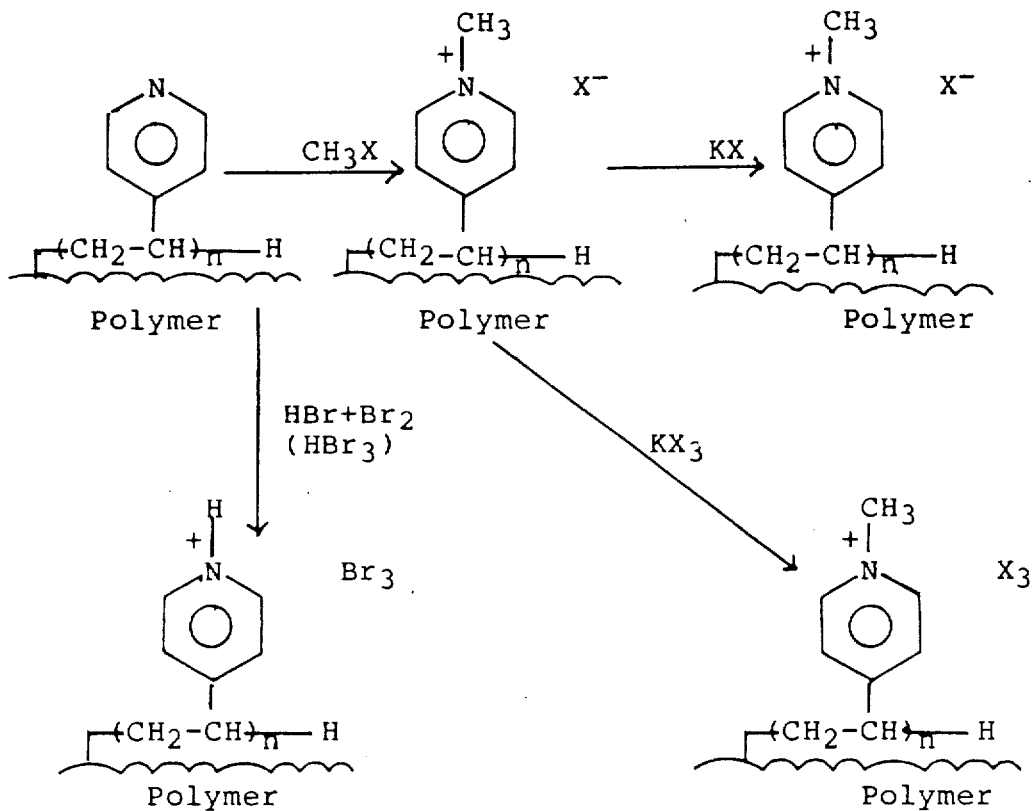

UNITED STATES PATENT AND TRADEMARK OFFICE
CERTIFICATE OF CORRECTION

PATENT NO. : 4,798,870
DATED : January 17, 1989
INVENTOR(S) : Lyle, Jr. et al

It is certified that error appears in the above-identified patent and that said Letters Patent is hereby corrected as shown below:

In column 4, cancel lines 13 to 29 and substitute therefor the following:

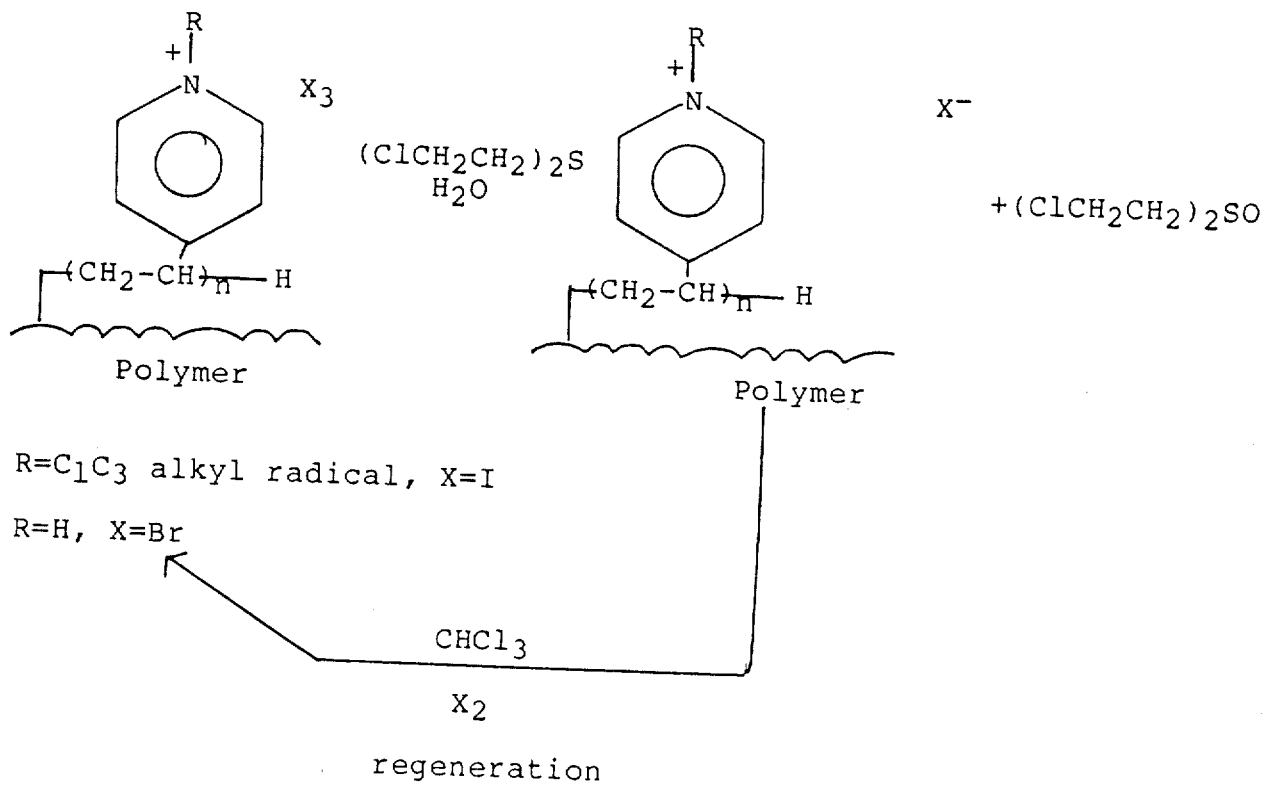

Signed and Sealed this

Sixth Day of June, 1989

Attest:

DONALD J. QUIGG

Attesting Officer    Commissioner of Patents and Trademarks